(12) United States Patent
Saleh et al.

(10) Patent No.: US 9,330,226 B1
(45) Date of Patent: May 3, 2016

(54) MODELING SUBSTRATE NOISE COUPLING FOR CIRCUIT SIMULATION

(71) Applicant: Mentor Graphics Corporation, Wilsonville, OR (US)

(72) Inventors: Mohamed Saleh Abouelyazid Saleh, Cairo (EG); Alaa El-Deen Barakat Ahmed El-Rouby, Cairo (EG)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 14/507,831

(22) Filed: Oct. 7, 2014

Related U.S. Application Data

(60) Provisional application No. 61/887,538, filed on Oct. 7, 2013.

(51) Int. Cl.
*G06F 17/50* (2006.01)

(52) U.S. Cl.
CPC ........ *G06F 17/5081* (2013.01); *G06F 17/5009* (2013.01); *G06F 2217/82* (2013.01)

(58) Field of Classification Search
CPC ............ G06F 17/5081; G06F 17/5009; G06F 2217/82
See application file for complete search history.

(56) References Cited

U.S. PATENT DOCUMENTS

| | | | |
|---|---|---|---|
| 6,557,154 B1 * | 4/2003 | Harada et al. | 716/115 |
| 6,941,258 B2 * | 9/2005 | Van Heijningen et al. | 703/16 |
| 7,203,629 B2 * | 4/2007 | Ozis et al. | 703/2 |
| 7,900,166 B2 * | 3/2011 | Kariat et al. | 703/14 |
| 8,255,849 B1 * | 8/2012 | Okhmatovski et al. | 716/110 |
| 8,549,449 B2 * | 10/2013 | Suaya et al. | 716/106 |
| 2005/0251770 A1 * | 11/2005 | Frank et al. | 716/5 |
| 2006/0036980 A1 * | 2/2006 | Kobayashi | 716/4 |

OTHER PUBLICATIONS

"Synthesized Compact Models for Substrate Noise Coupling in Mixed-Signal ICS", by Hai Lan, Mar. 2006.*

Stanisic, Balsha R., Nishath K. Verghese, Rob A. Rutenbar, L. Richard Carley, and David J. Allstot. "Addressing substrate coupling in mixed-mode ICs: Simulation and power distribution synthesis." Solid-State Circuits, IEEE Journal of 29, No. 3 (1994): 226-238.

Silveira, Luis Miguel, and Nuno Vargas. "Characterizing substrate coupling in deep-submicron designs." Design & Test of Computers, IEEE 19, No. 2 (2002): 4-15.

Pfost, Martin, and H-M. Rein. "Modeling and measurement of substrate coupling in Si-bipolar IC's up to 40 GHz." Solid-State Circuits, IEEE Journal of 33, No. 4 (1998): 582-591.

Gharpurey, Ranjit, and Srinath Hosur. "Transform domain techniques for efficient extraction of substrate parasitics." In Proceedings of the 1997 IEEE/ACM international conference on Computer-aided design, pp. 461-467. IEEE Computer Society, 1997.

(Continued)

*Primary Examiner* — Nha Nguyen

(74) *Attorney, Agent, or Firm* — Plumsea Law Group, LLC.

(57) ABSTRACT

Aspects of the disclosed techniques relate to techniques for modeling substrate noise coupling. Electrical impedance between two contacts in the presence of one or more other contacts is modeled based on a horizontal impedance model and an L-shaped impedance model. The one or more other contacts may be clustered together in four regions first and then are represented by the horizontal impedance model and/ or the L-shaped impedance model. The electrical impedance is inserted into netlist for circuit simulation.

16 Claims, 10 Drawing Sheets

Flow chart
700

(56) References Cited

OTHER PUBLICATIONS

Samavedam, Anil, Aline Sadate, Kartikeya Mayaram, and Terri S. Fiez. "A scalable substrate noise coupling model for design of mixed-signal IC's." Solid-State Circuits, IEEE Journal of 35, No. 6 (2000): 895-904.

Van Genderen, A. J., N. P. Van der Meijs, and T. Smedes. "Fast computation of substrate resistances in large circuits." In Proceedings of the 1996 European conference on Design and Test, p. 560. IEEE Computer Society, 1996.

Ozis, Dicle, Terri Fiez, and Karti Mayaram. "A comprehensive geometry-dependent macromodel for substrate noise coupling in heavily doped CMOS processes." In Custom Integrated Circuits Conference, 2002. Proceedings of the IEEE 2002, pp. 497-500. IEEE, 2002

Lan, Hai, Zhiping Yu, and Robert W. Dutton. "A CAD-oriented modeling approach of frequency-dependent behavior of substrate noise coupling for mixed-signal IC design." In Quality Electronic Design, 2003. Proceedings. Fourth International Symposium on, pp. 195-200. IEEE, 2003.

Li, Hongmei, Jorge Carballido, Harry H. Yu, Vladimir I. Okhmatovski, Elyse Rosenbaum, and Andreas C. Cangellaris. "Comprehensive frequency-dependent substrate noise analysis using boundary element methods." In Proceedings of the 2002 IEEE/ACM international conference on Computer-aided design, pp. 2-9. ACM, 2002.

Xu, Chenggang, Terri Fiez, and Karti Mayaram. "High frequency lumped element models for substrate noise coupling." In Behavioral Modeling and Simulation, 2003. BMAS 2003. Proceedings of the 2003 International Workshop on, pp. 47-50. IEEE, 2003.

Wang, Yongsheng, Shanshan Liu, Fang Li, Fengchang Lai, and Mingyan Yu. "Modeling of substrate coupling noise in lightly doped mixed-signal ICs." InOptoelectronics and Microelectronics (ICOM), 2012 International Conference on, pp. 482-485. IEEE, 2012.

* cited by examiner

Flow chart
700

MODELING SUBSTRATE NOISE COUPLING FOR CIRCUIT SIMULATION

RELATED APPLICATIONS

This application claims benefit of U.S. Provisional Patent Application No. 61/887,538, filed on Oct. 7, 2013, which application is incorporated entirely herein by reference.

FIELD OF THE DISCLOSED TECHNIQUES

The disclosed techniques relates to circuit simulation technologies. Various implementations of the disclosed techniques may be particularly useful for circuit design and verification.

BACKGROUND OF THE DISCLOSED TECHNIQUES

The push for reduced cost, more compact circuit boards, and added customer features has provided incentives for the inclusion of analog functions on primarily digital MOS integrated circuits (ICs) forming mixed-signal ICs. Single-chip designs combining digital and analog blocks built over a common substrate feature reduced levels of power dissipation, smaller package counts, and smaller package interconnect parasitics. The global analog/mixed signal market has expanded rapidly, doubling the size in six years from $31.7 billion in 2005 to over $60 billion in 2011.

The design of analog/mixed-signal systems, however, is a complicated task. There are many challenges in realizing mixed-signal ICs. One of the challenges is to minimize noise coupling between various parts of the system to avoid any malfunctioning of the system. In particular, noise coupled through the substrate has been identified as a major concern. Fast-switching logic components inject current into the substrate, causing voltage fluctuation. Because substrate bias strongly affects the transistor threshold voltage, voltage fluctuations can affect the operation of sensitive analog circuitry through the body effect. FIG. 3A illustrates this coupling mechanism. In the figure, a switching digital node 310 serves as a noise source and injects currents $J_1$ (320) and $J_2$ (330) into the substrate 340 which is connected to ground. A sensitive analog node 350 picks up the noise due to the varying local substrate potential $V_b$ (360) caused by $J_2$ (320). FIG. 3B illustrates this interaction from the circuit viewpoint. There are other known mechanisms for current injection into the substrate such as hot-carrier injection and parasitic bipolar transistors.

As technology and circuit design advance, substrate noise is beginning to plague even fully digital circuits. In these circuits, the cumulative effect of thousands or millions of logic gates changing state across the chip causes current pulses that are injected and absorbed into the substrate. Those currents are then transmitted to power and ground buses through direct feed-through and load charge and discharge. Such couplings are highly destructive because pulsing currents, partially injected into the substrate through impact ionization and capacitive coupling, can be broadcast over great distances and picked up by sensitive circuits through capacitive coupling and the body effect. The resulting threshold voltage modulation dynamically changes gate delays locally, affecting performance unpredictably. Switching noise is especially detrimental to dynamic logic, memories, and embedded analog circuits such as phase-locked loops. It can impair the performance of the integrated circuit, and even totally corrupt the functionality of the system.

It is thus important to develop modeling techniques that can predict the noise coupling before fabrication. One category of the conventional modeling techniques are based on formulating and numerically analyzing the substrate's electromagnetic interactions. A device simulator called Pisces is an example. While accurate, Pisces is not designed for circuit simulation. Some other simulators are based on solving differential equations numerically such as finite-element and finite difference methods. These methods perform a full domain discretization on the large but bounded substrate volume and may be able to handle large and dense designs. The computation cost, however, is still too high.

Another category of the conventional modeling techniques are formula-based. In one such technique, a macromodel with four parameters is constructed based on a physical understanding of the current flow paths in heavily doped substrates. These parameters can be determined using simple curve fitting from actual device measurements or device simulations for different distances of separation between the injection and sensing ports (contacts) on the substrate. These formula-based techniques are orders of magnitude faster than the numerical-analysis-based techniques because they directly evaluate mathematical expressions and can help designers to gain insight into the placement of various components before the final layout is done. Challenges, however, remain in developing fast and accurate macromodeling techniques that can be applied to not just simple but more complex geometric arrangements between noise sources and noise receivers.

BRIEF SUMMARY OF THE DISCLOSED TECHNIQUES

Aspects of the disclosed techniques relate to techniques for modeling substrate noise coupling. In one aspect, there is a method comprising: modeling electrical impedance between a first element and a second element in the presence of one or more other elements based on a horizontal impedance model and an L-shaped impedance model, wherein the first element, the second element and the one or more other elements are substrate contacts in a layout design and/or particular areas of the layout design, the horizontal impedance model models electrical impedance for two elements in the presence of a neighboring element positioned on a line that passes through the two elements (a horizontal configuration), and the L-shaped impedance model models electrical impedance for two elements in the presence of a neighboring element positioned on a line that passes through one of the two elements and is perpendicular to a line passing through the two elements (an L-shaped configuration); and performing circuit simulation on a circuit associated with the layout design, wherein the circuit includes a parasitic element having the electrical impedance.

In some embodiments of the disclosed techniques, the modeling comprises: combining the one or more other elements into a smaller number of elements; and representing the smaller number of elements with one or more elements that forms the horizontal configuration and/or the L-shaped configuration with the first element and the second element. the combining may comprise clustering the one or more other elements based on four regions shown in FIG. 8.

In some other embodiments of the disclosed techniques, the modeling comprises: using one or more elements that forms the horizontal configuration and/or the L-shaped configuration with the first element and the second element to represent the one or more other elements; and combining elements in the one or more elements that forms the horizontal configuration into a single element and elements in the one or more elements that forms the L-shaped configuration into a single element.

In another aspect, there is a non-transitory computer readable medium storing processor-executable instructions for causing one or more processors to perform a method, the method comprises: modeling electrical impedance between a first element and a second element in the presence of one or more other elements based on a horizontal impedance model and an L-shaped impedance model, wherein the first element, the second element and the one or more other elements are substrate contacts in a layout design and/or particular areas of the layout design, the horizontal impedance model models electrical impedance for two elements in the presence of a neighboring element positioned on a line that passes through the two elements (a horizontal configuration), and the L-shaped impedance model models electrical impedance for two elements in the presence of a neighboring element positioned on a line that passes through one of the two elements and is perpendicular to a line passing through the two elements (an L-shaped configuration); and performing circuit simulation on a circuit associated with the layout design, wherein the circuit includes a parasitic element having the electrical impedance.

In still another aspect, there is a system, comprising: a substrate parasitics modeling unit configured to model electrical impedance between a first element and a second element in the presence of one or more other elements based on a horizontal impedance model and an L-shaped impedance model, wherein the first element, the second element and the one or more other elements are substrate contacts in a layout design and/or particular areas of the layout design, the horizontal impedance model models electrical impedance for two elements in the presence of a neighboring element positioned on a line that passes through the two elements (a horizontal configuration), and the L-shaped impedance model models electrical impedance for two elements in the presence of a neighboring element positioned on a line that passes through one of the two elements and is perpendicular to a line passing through the two elements (an L-shaped configuration); and a simulation unit configured to perform circuit simulation on a circuit associated with the layout design, wherein the circuit includes a parasitic element having the electrical impedance.

In some embodiments of the disclosed techniques, the substrate parasitics modeling unit comprises: a clustering subunit configured to combine the one or more other elements into a smaller number of elements; and a projection subunit configured to represent the smaller number of elements with one or more elements that forms the horizontal configuration and/or the L-shaped configuration with the first element and the second element.

In some other embodiments of the disclosed techniques, the substrate parasitics modeling unit comprises: a projection subunit configured to use one or more elements that forms the horizontal configuration and/or the L-shaped configuration with the first element and the second element to represent the one or more other elements; and a clustering subunit configured to combine elements in the one or more elements that forms the horizontal configuration into a single element and elements in the one or more elements that forms the L-shaped configuration into a single element.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed techniques. Thus, for example, those skilled in the art will recognize that the disclosed techniques may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNIQUES

Figure 1:
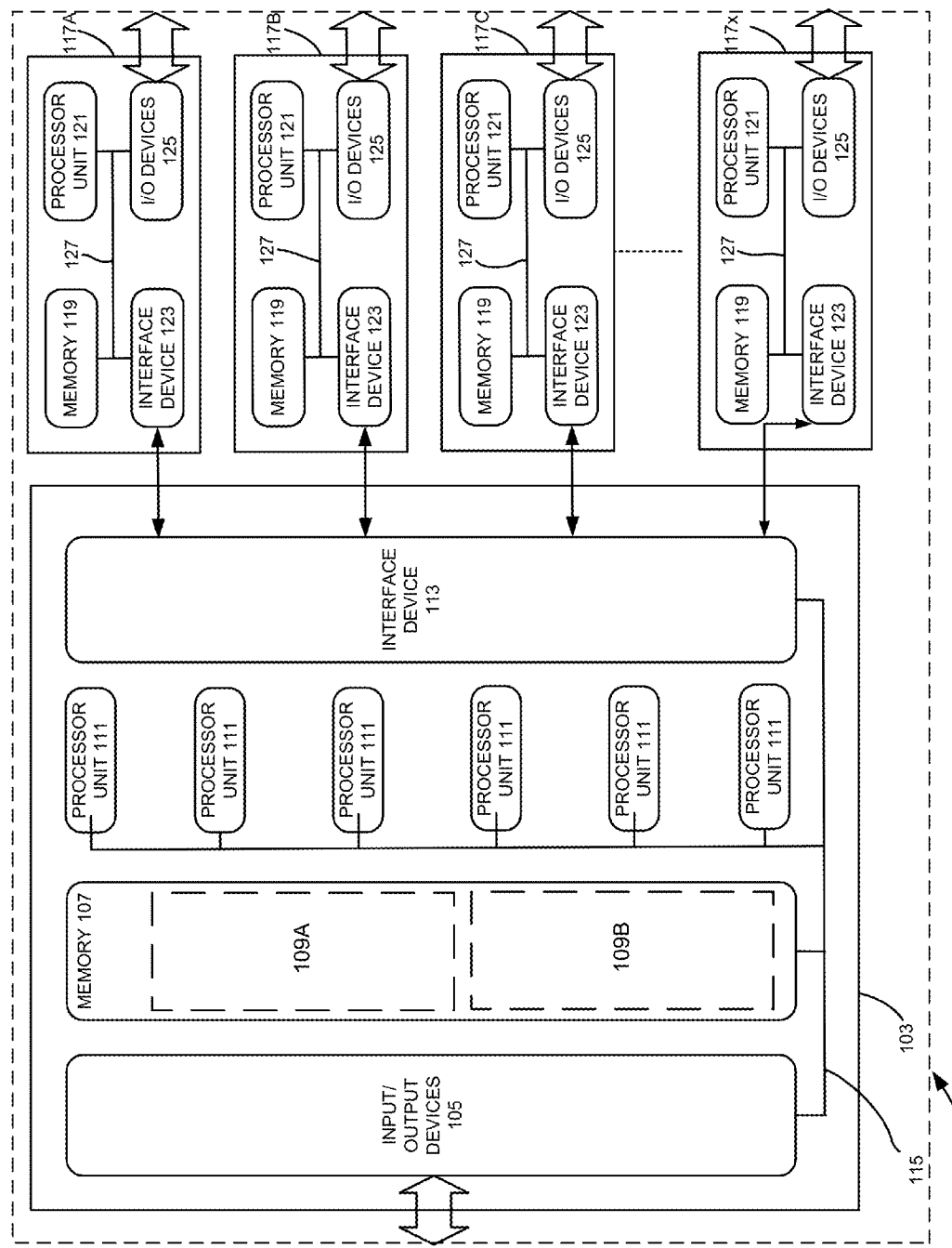
FIG. 1 illustrates an example of a computing system that may be used to implement various embodiments of the disclosed techniques.

Various aspects of the disclosed techniques relate to techniques for modeling substrate noise coupling. In the following description, numerous details are set forth for purpose of explanation. However, one of ordinary skill in the art will realize that the disclosed techniques may be practiced without the use of these specific details. In other instances, well-known features have not been described in detail to avoid obscuring the disclosed techniques.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "model" and "perform" to describe the disclosed methods. These terms are high-level abstractions of the actual operations that are performed. The actual operations that correspond to these terms may vary depending on the particular implementation and are readily discernible by one of ordinary skill in the art.

Any of the disclosed techniques can be implemented in whole or in part by software comprising computer-executable instructions stored on computer-readable media. Such software can comprise, for example, an appropriate electronic design automation ("EDA") software tool (e.g., an automatic test pattern generation ("ATPG") tool). Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language. Any of the disclosed methods can alternatively be implemented (partially or completely) in hardware (e.g., an ASIC, PLD, or SoC).

Any data produced from any of the disclosed methods (e.g., intermediate or final test patterns, test patterns values, or control data) can be stored on computer-readable media (e.g., tangible computer-readable media, such as one or more CDs, volatile memory components (such as DRAM or SRAM), or nonvolatile memory components (such as hard drives)) using a variety of different data structures or formats. Such data can be created, updated, or stored using a local computer or over a network (e.g., by a server computer).

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked, and includes both direct connections or direct links and indirect connections or indirect links through one or more intermediate elements not affecting the intended operation of the circuit. Furthermore, the term "design" is intended to encompass data describing an entire microdevice, such as an integrated circuit device or micro-electromechanical system (MEMS) device. This term also is intended to encompass a smaller group of data describing one or more components of an entire microdevice, however, such as a layer of an integrated circuit device, or even a portion of a layer of an integrated circuit device. Still further, the term "design" also is intended to encompass data describing more than one microdevice, such as data to be used to create a mask or reticle for simultaneously forming multiple microdevices on a single wafer. The layout design data may be in any desired format, such as, for example, the Graphic Data System II (GDSII) data format or the Open Artwork System Interchange Standard (OASIS) data format proposed by Semiconductor Equipment and Materials International (SEMI). Other formats include an open source format named Open Access, Milkyway by Synopsys, Inc., and EDDM by Mentor Graphics, Inc.

Illustrative Operating Environment

The execution of various electronic design automation processes according to embodiments of the disclosed techniques may be implemented using computer-executable software instructions executed by one or more programmable computing devices. Because these embodiments of the disclosed techniques may be implemented using software instructions, the components and operation of a generic programmable computer system on which various embodiments of the disclosed techniques may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed techniques.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed techniques. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
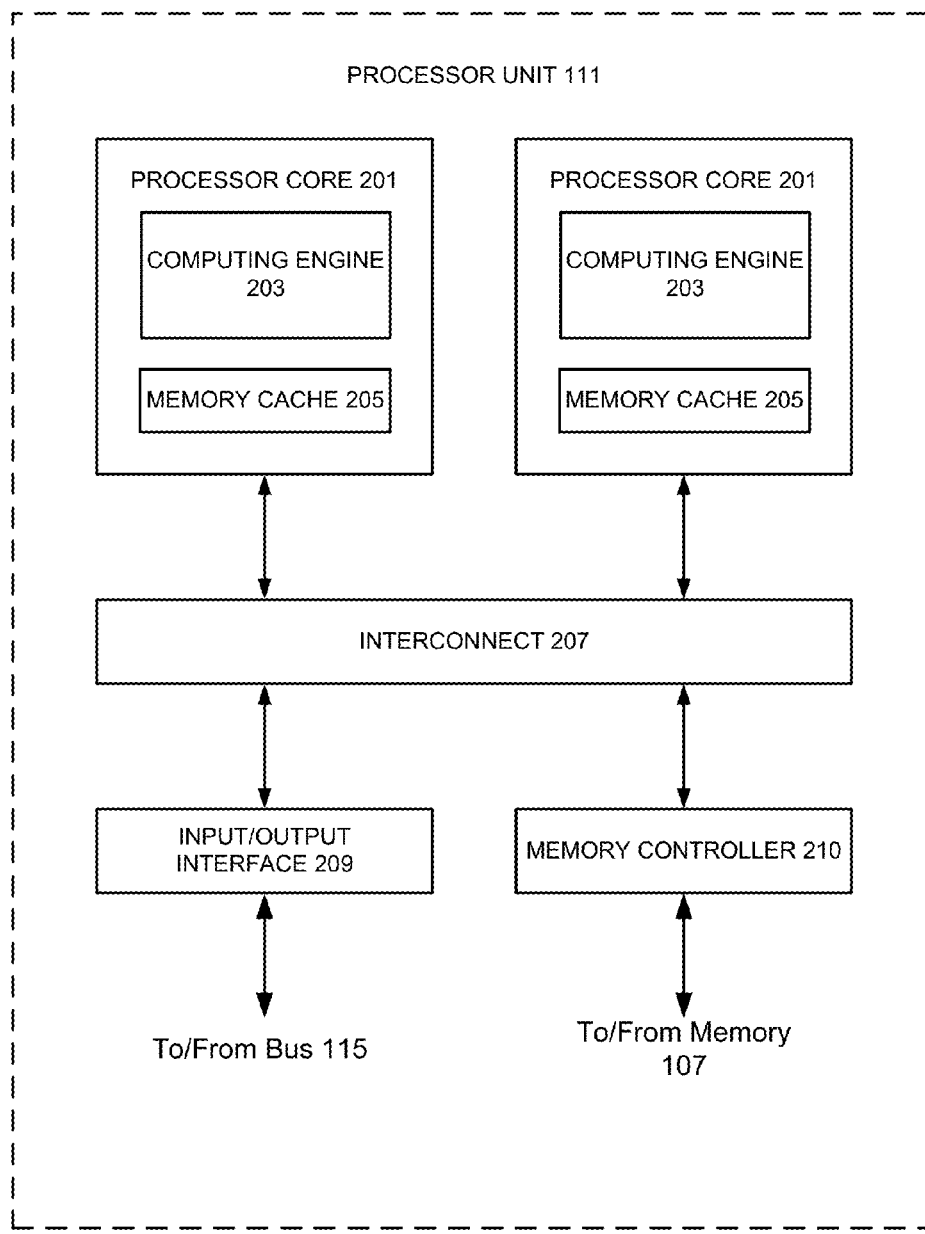
FIG. 2 illustrates an example of a multi-core processor unit that may be used to implement various embodiments of the disclosed techniques.
Figures 3A, 3B:
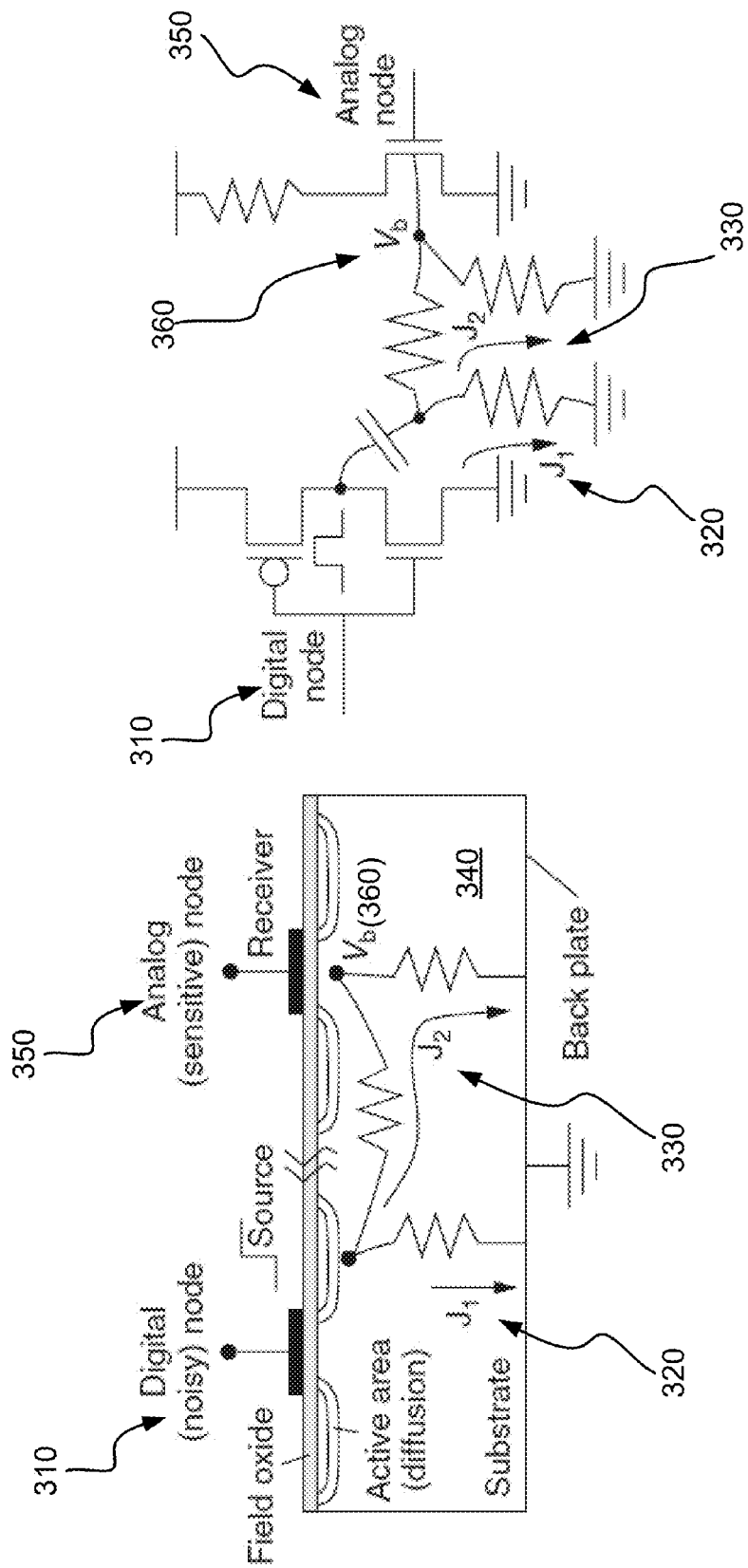
FIG. 3A illustrates one substrate noise coupling mechanism.
FIG. 3B shows a circuit that illustrates the substrate noise coupling mechanism shown in FIG. 3A.

With some implementations of the disclosed techniques, the master computing device 103 may employ one or more processing units 111 having more than one processor core. Accordingly, FIG. 2 illustrates an example of a multi-core processor unit 111 that may be employed with various embodiments of the disclosed techniques. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed techniques, the processor units 111 may include additional components, such as a high-level cache memory accessible shared by the processor cores 201.

While FIG. 2 shows one illustration of a processor unit 111 that may be employed by some embodiments of the disclosed techniques, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed techniques may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed techniques, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed techniques may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed techniques, either the computer 103, one or more of the servant computers 117, or some combination of both may use two or more different interface devices 113 or 123 for communicating over multiple communication interfaces.

With various examples of the disclosed techniques, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed techniques, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed techniques.

Substrate Parasitic Models for Noise Coupling Between Two Isolated Contacts ing between contacts, and the contacts area on the self-coupling (the coupling between each contact and the ground) and the mutual-coupling (the coupling between the two contacts).

TABLE 1

| | Increasing Variables | | | |
| --- | --- | --- | --- | --- |
| Coupling type | frequency | Contact separation (S) | Substrate conductivity($\sigma$) | Contact's area(A) |
| Mutual-coupling | Increases | Decreases | Increases | Increases |
| Self-coupling | Increases | Increases | Increases | Increases |

Table 2 lists five substrate parasitics models and their accuracy and frequency range of application.

TABLE 2

| Model Number | Circuit configuration | Frequency Ranges | comments |
| --- | --- | --- | --- |
| Model 0 |  | F < 1 GHz | The simplest low frequency model |
| Model I | 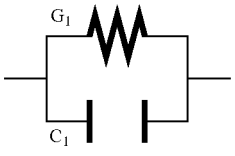 | 1 GHz < f < 5 GHz | Not able to model the frequency dependence of G. Capacitive coupling only |
| Model II | 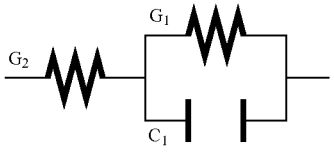 | 5 GHz < f < 10 GHz | Capable of modeling the frequency dependence of G and B. Capacitive susceptance and conductance that increases with frequency |
| Model III | 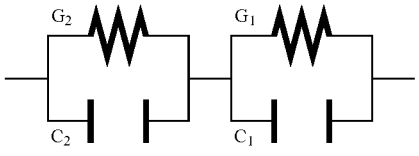 | F > 5 GHz | Similar to Model II but with better agreement with simulations |
| Model IV | 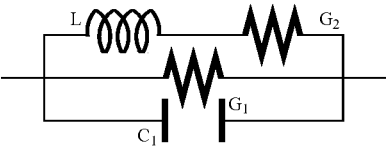 | F > 1 GHz | Suitable for both capacitive and inductive coupling. Good agreement with simulations |

Figure 4:
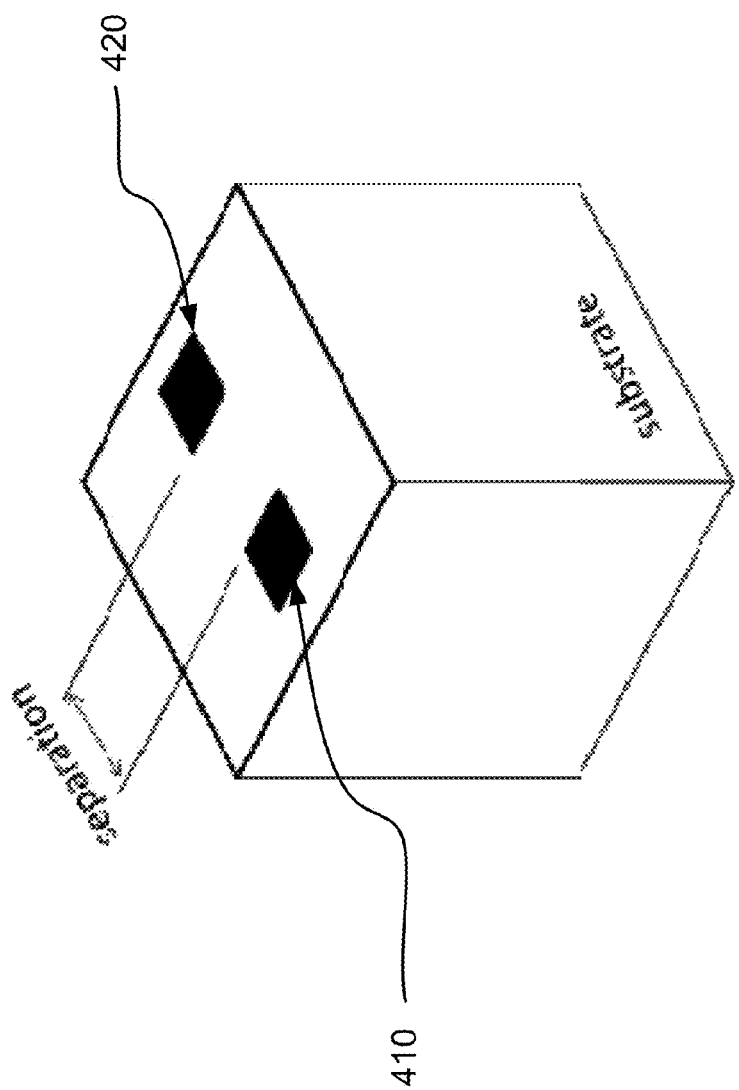
FIG. 4 illustrates two isolated contacts of the same size and shape.
Figure 5:
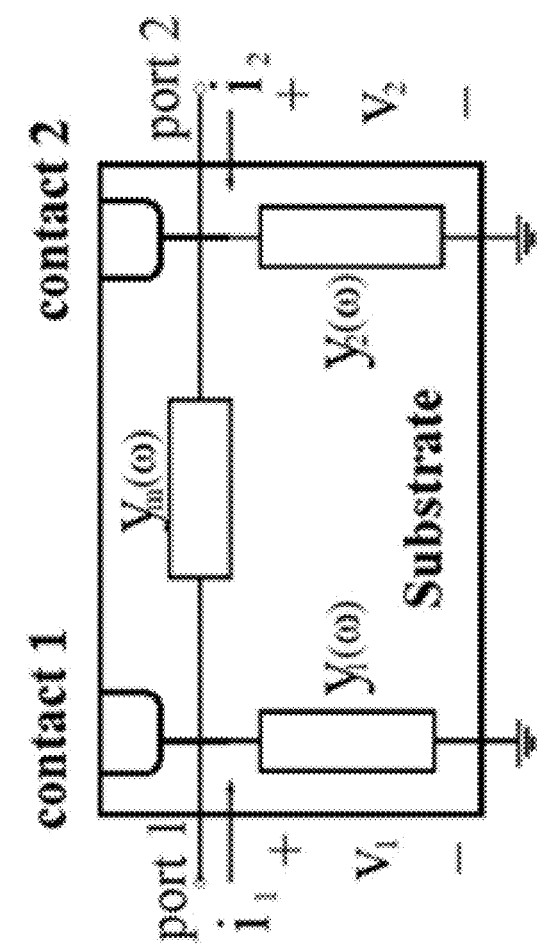
FIG. 5 illustrates a circuit for a substrate parasitics model for two isolated contacts.
Figure 5:
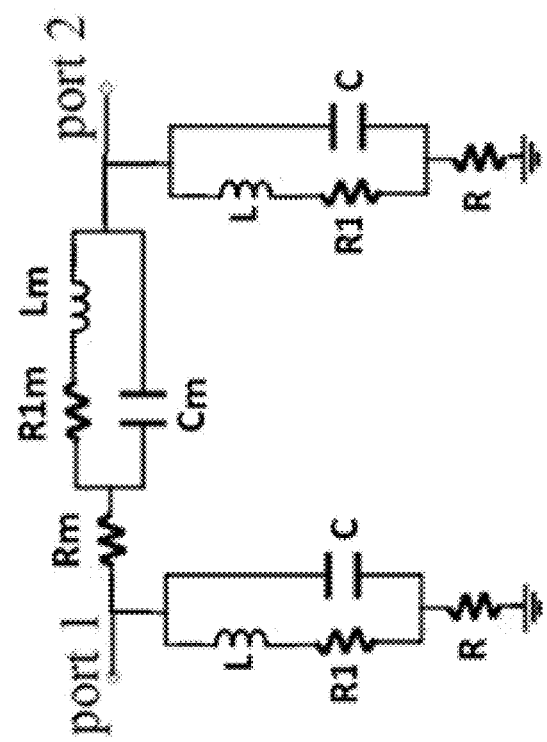

FIG. 4 illustrates two isolated contacts 410 and 420 with the same size and shape. In this disclosure, contacts comprise substrate contacts including transistor bulk connections and particular areas of a layout design. Due to the symmetry of the two contacts, the self-admittance components of the admittance between them, $y_{11}$ and $y_{22}$, are the same. Using an electromagnetic field solver simulator (HFSS) available from ANSYS, Inc., a parametric sweep has been made by changing some parameters (contact size, spacing between contacts and substrate conductivity) to extract the substrate parasitics under different conditions. Table 1 shows the impact of increasing the frequency, the substrate conductivity, the spac- FIG. 5 illustrates a circuit for another substrate parasitics model for two isolated contacts. This model takes into consideration inductive effects. It contains two resistors ($R_m$ (510) and $R1_m$ (520)), one inductor ($L_m$ (530)) and a capacitor ($C_m$ (540)). The resistor 510 represents the resistive nature of the substrate; the capacitor 540 represents the capacitive coupling between the contact and ground, and between the contact and the surrounding contacts; and the inductor 530 and the resistor 520 represent the inductive coupling of the substrate, i.e, eddy current. The Y admittance matrix of this model is given by:

$$[y(\omega)] = \begin{bmatrix} y_{11}(\omega) & y_{12}(\omega) \\ y_{21}(\omega) & y_{22}(\omega) \end{bmatrix} = \begin{bmatrix} y_1(\omega) + y_m(\omega) & -y_m(\omega) \\ -y_m(\omega) & y_1(\omega) + y_m(\omega) \end{bmatrix} \quad (1)$$

where $y_m$ represents the mutual admittance, $y_1$ represents the self-admittance and they are determined as follows:

$$y_m = \frac{1 - \omega^2 * C_m * L_m + j\omega * C_m * R1_m}{R1_m + R_m - \omega^2 * C_m * L_m * R_m + j\omega * (C_m * R1_m * R_m + L_m)} \quad (2)$$

and $$y_1 = \frac{1 - \omega^2 * C * L1 + j\omega * C * R1}{R1 + R - \omega^2 * C * L * R + j\omega * (C * R1 * R + L)} \quad (3)$$

This model can operate at low and high frequencies and is suitable for both capacitive and inductive coupling. Table 3 shows the relations between the lumped model's components and the design variables (separation between contacts, contact size, and substrate conductivity). These relations are obtained from parametric field solver simulations. One of the relations states that increasing the separation between the contacts decreases the coupling between them and increases the coupling between each contact and ground. Accordingly, the shunt capacitance "C" will increase, while the series capacitance "$C_m$" will decrease with increasing the contacts separation. On the other hand, the shunt resistances and inductances "R, R1, and L" will decrease and the series resistances and inductances "$R_m$, $R1_m$, $L_m$" will increase with increasing the contacts separation.

TABLE 3

| | Increasing Variables | | |
|---|---|---|---|
| Component | Contact's separation (S) | Substrate conductivity (σ) | Contact's area (A) |
| R | Decreases | Decreases | Increases |
| R1 | Decreases | Decreases | Decreases |
| L | Decreases | Decreases | Decreases |
| C | Increases | Increases | Increases |
| Rm | Increases | Decreases | Increases |
| R1m | Increases | Decreases | Decreases |
| Lm | Increases | Decreases | Decreases |
| Cm | Decreases | Increases | Increases |

Based on the relationships shown in table 3, a closed form mathematical expression proposed for each component as follows:

$$R = \frac{k_{1R} * \sigma + k_{2R}}{k_{3R} * S + k_{4R} * A + k_{5R}} \quad (4)$$

$$R1 = \frac{k_{1R1}}{k_{2R1} * S + k_{3R1} * A + k_{4R1} * \sigma + k_{5R1}} \quad (5)$$

$$L = \frac{k_{1L}}{k_{2L} * S + k_{3L} * A + k_{4L} * \sigma + k_{5L}} \quad (6)$$

$$C = \log 2\left(\frac{k_{1C} * S + k_{2C} * A + k_{3C} * \sigma + k_{4C}}{k_{SC}}\right) \quad (7)$$

$$R_m = \frac{k_{1Rm} * S + k_{2Rm} * \sigma + k_{3Rm}}{k_{4Rm} * A + k_{5Rm}} \quad (8)$$

$$R1_m = \frac{k_{1R1m} * S + k_{2R1m}}{k_{3R1m} * \sigma + k_{4R1m} * A + k_{5R1m}} \quad (9)$$

$$L_m = \frac{k_{1Lm} * S + k_{2Lm}}{k_{3Lm} * \sigma + k_{4Lm} * A + k_{5Lm}} \quad (10)$$

$$C_m = \log 2\left(\frac{k_{1Cm} * A + k_{2Cm} * \sigma + k_{3Cm}}{k_{4Cm} * S + k_{5Cm}}\right) \quad (11)$$

where the "ks" are the unknowns. The curve fitting may be used to obtain appropriate values for the model's components.

Noise Coupling Between Two Contacts in the Presence of a Third Contact

Figure 10B:
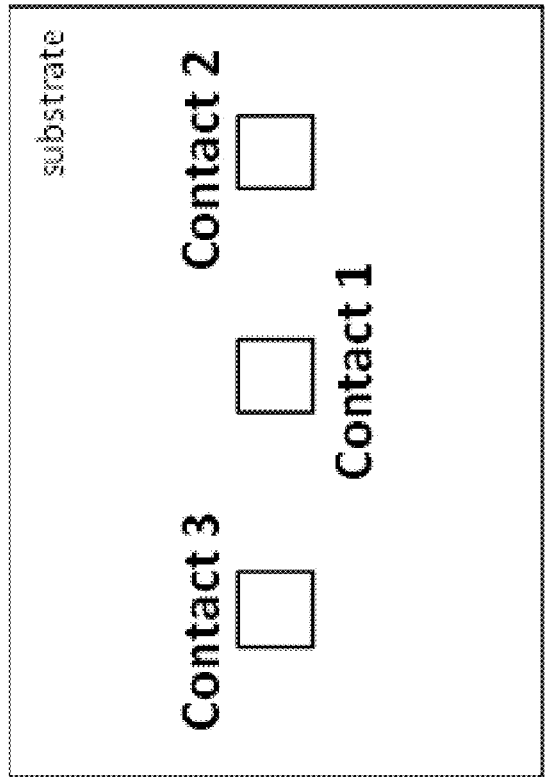
FIG. 10B illustrates an example of three contacts in a horizontal configuration.
Figure 10A:
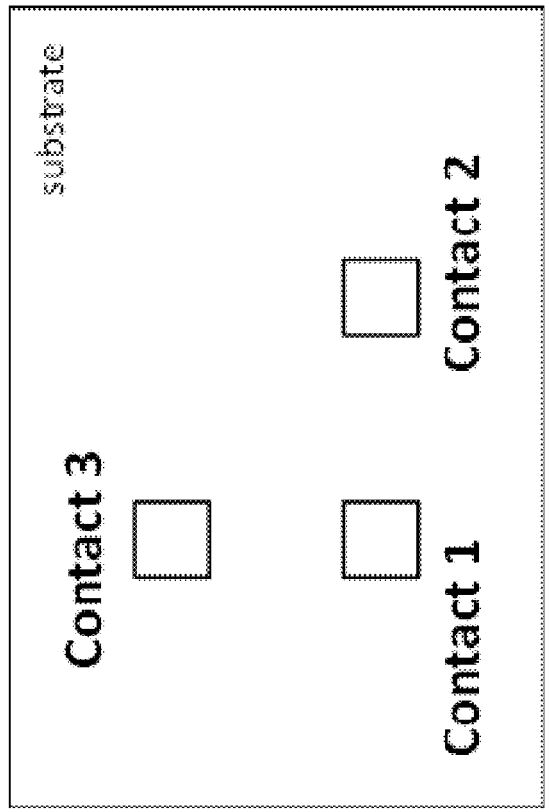
FIG. 10A illustrates an example of three contacts in an L-shaped configuration.

FIGS. 10A and 10B illustrate two special cases for noise coupling between two contacts in the presence of a third contact, respectively: an L-shaped configuration and a horizontal configuration. In the two figures, contact 1 is an aggressor or source contact, contact 2 is a victim or sensor contact, and contact 3 is a neighboring contact. Simulations by the electromagnetic field solver simulator, HFSS, show the presence of contact 3 affect both the self-admittances and mutual admittances. The impact can be represented by a factor (alpha):

$$\text{alpha} = \frac{y_{(not\ isolated)}}{y_{(isolated)}} \quad (12)$$

where $y_{(not\ isolated)}$ represents the admittances values in the presence of the surrounding contacts and $y_{(isolated)}$ represents the admittances values for two isolated contacts, no surrounding contacts.

Table 4 shows the impact of increasing the frequency, S13 (separation between contact 1 and contact 3), and S12 (separation between contact 1 and contact 2) on alpha.

TABLE 4

| | Alpha | | | | | | | |
|---|---|---|---|---|---|---|---|---|
| | L-Shape distribution | | | | Horizontal distribution | | | |
| | Y11 | | Y12 | | Y11 | | Y12 | |
| | Real | Imag. | Real | Imag. | Real | Imag. | Real | Imag. |
| frequency | ↑ | Const. | ↑ | Const. | ↑ | Const. | ↑ | Const |
| S13 | ↓ | ↓ | ↑ | ↑ | ↓ | ↓ | ↑ | ↑ |
| S12 | ↓ | ↓ | ↑ | ↑ | ↓ | ↓ | ↑ | ↑ |

Using the relationships stated in Table 4, Alpha can be obtained by:

For imaginary parts:

$$\text{imaginary(alpha)} = k1a + k2a * S13^{k3a} + k4a * S12^{k5a} \quad (13)$$

For real parts:

$$\text{real(alpha)} = k6a + k7a * S13^{k8a} + k9a * S12^{k10a} + k11a * \text{freq}^{k12a} \quad (14)$$

where "ks" represent the unknown coefficients that are evaluated using curve fitting processes.

Circuit Simulation Tool and Methods

Figure 6B:
FIG. 6B illustrates an example of the substrate parasitics modeling unit in the circuit simulation tool shown in FIG. 6A that may be implemented according to various embodiments of the disclosed techniques.
Figure 6C:
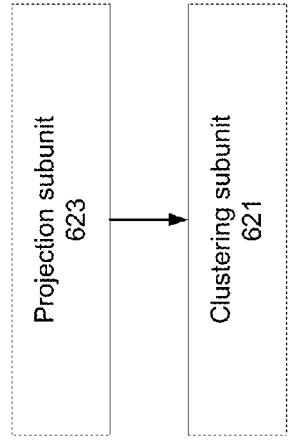
FIG. 6C illustrates another example of the substrate parasitics modeling unit in the circuit simulation tool shown in FIG. 6A that may be implemented according to various embodiments of the disclosed techniques.
Figure 6A:
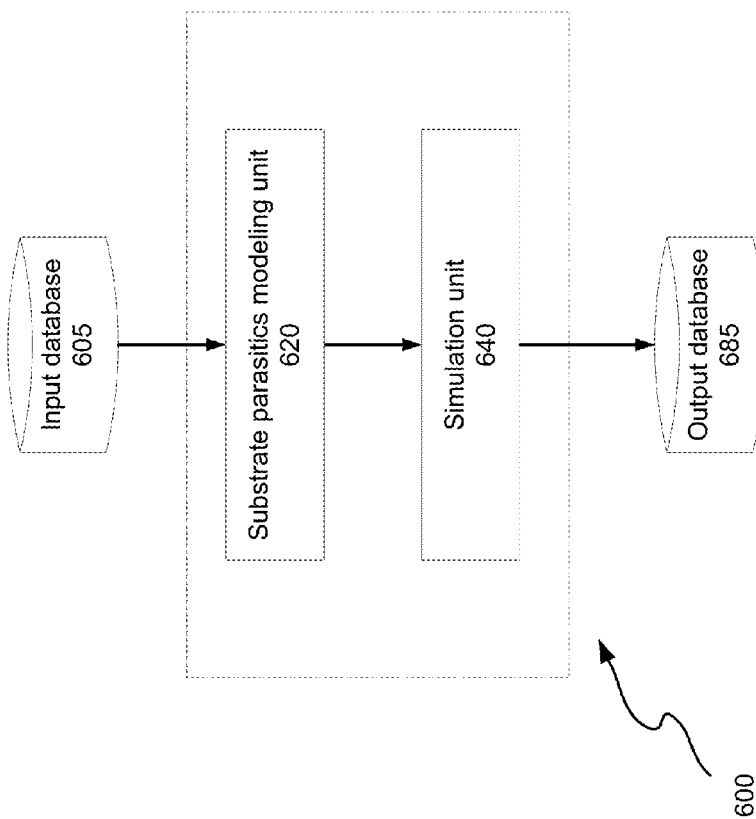
FIG. 6A illustrates an example of a circuit simulation tool that may be implemented according to various embodiments of the disclosed techniques.

FIG. 6A illustrates an example of a circuit simulation tool 600 that may be implemented according to various embodiments of the disclosed techniques. As seen in this figure, the circuit simulation tool 600 includes a substrate parasitics modeling unit 620 and a simulation unit 640. The substrate parasitics modeling unit 620 may comprise two subunits: clustering subunit 621 and projection subunit 623, as shown in FIGS. 6B and 6C. As will be discussed in more detail below, the substrate parasitics modeling unit 620 models electrical impedance between a first element and a second element in the presence of one or more other elements by using a horizontal impedance model and an L-shape impedance model. In some embodiments of the disclosed techniques illustrated in FIG. 6B, the clustering subunit 621 first combines the one or more other elements into a smaller number of elements and the projection subunit 623 then uses the horizontal impedance model and/or the L-shape impedance model to represent the smaller number of elements. In some other embodiments of the disclosed techniques illustrated in 6C, the projection subunit 623 first derives horizontal/vertical impedance components by using the horizontal impedance model and/or the L-shape impedance model to represent the one or more other elements and the clustering subunit 621 then combines the derived horizontal/vertical impedance components. The simulation unit 640 performs circuit simulation on a circuit that includes a parasitic element having the electrical impedance.

As will also be discussed in more detail below, some implementations of the circuit simulation tool 600 may cooperate with (or incorporate) one or more of an input database 605 and an output database 685. While the input database 605 and the output database 685 are shown as separate units in FIG. 6A, a single data storage medium may be used to implement some or both of these databases.

According to some embodiments of the disclosed techniques, one or more of the substrate parasitics modeling unit 620, the clustering subunit 621, the projection subunit 623 and the simulation unit 640 are implemented by one or more computing systems, such as the computing system illustrated in FIGS. 1 and 2, executing programmable instructions. Correspondingly, some other embodiments of the disclosed techniques may be implemented by software-executable instructions, stored on a non-transitory computer-readable medium, for instructing a computing system to perform functions of one or more of the substrate parasitics modeling unit 620, the clustering subunit 621, the projection subunit 623 and the simulation unit 640. As used herein, the term "non-transitory computer-readable medium" refers to computer-readable medium that are capable of storing data for future retrieval, and not for propagating electro-magnetic waves. The non-transitory computer-readable medium may be, for example, a magnetic storage device, an optical storage device, a "punched" surface type device, or a solid state storage device.

Figure 7:
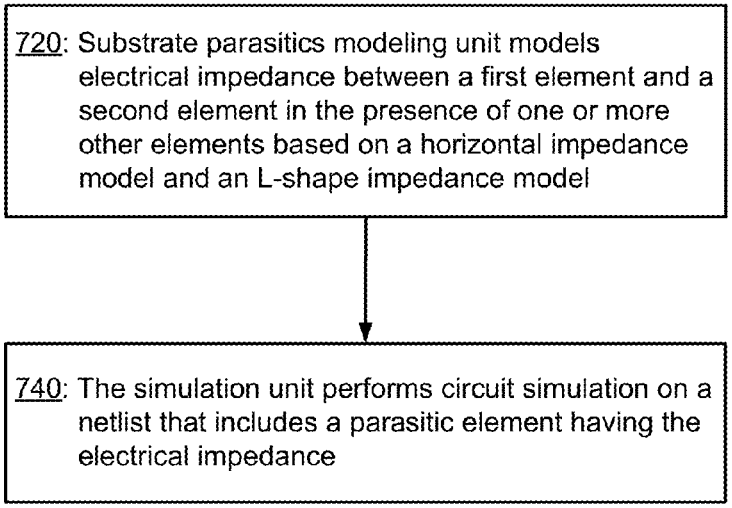
FIG. 7 illustrates an example of a flow chart describing a method for modeling substrate noise coupling that may be employed according to various embodiments of the disclosed techniques.

For ease of understanding, methods for modeling substrate noise coupling that may be employed according to various embodiments of the disclosed techniques will be described with reference to the circuit simulation tool 600 in FIG. 6A and the flow chart 700 illustrated in FIG. 7. It should be appreciated, however, that alternate implementations of a circuit simulation tool may be used to perform the methods for modeling substrate noise coupling illustrated by the flow chart 700 according to various embodiments of the disclosed techniques. Likewise, the circuit simulation tool 600 may be employed to perform other methods for modeling substrate noise coupling according to various embodiments of the disclosed techniques.

Initially, in operation 720 of the flowchart 700, the substrate parasitics modeling unit 620 models electrical impedance between a first element and a second element in the presence of one or more other elements based on a horizontal impedance model and an L-shape impedance model. The first element, the second element and the one or more other elements are substrate contacts in a layout design and/or particular areas of the layout design and are also referred to as contacts here. The horizontal impedance model models electrical impedance for two elements in the presence of a neighboring element positioned on a line that passes through the two elements (the horizontal configuration as shown in FIG. 10B), and the L-shape impedance model models electrical impedance for two elements in the presence of a neighboring element positioned on a line that passes through one of the two elements and is perpendicular to a line passing through the two elements (the L-shaped configuration as shown in FIG. 10A).

As noted previously, the substrate parasitics modeling unit 620 may comprise the clustering subunit 621 and the projection subunit 623, configured in a way shown in FIG. 6B. In this configuration, the clustering subunit 621 first combines the one or more other elements into a smaller number of elements, and the projection subunit 623 then uses the horizontal impedance model and/or the L-shape impedance model to represent the smaller number of elements.

Figure 8:
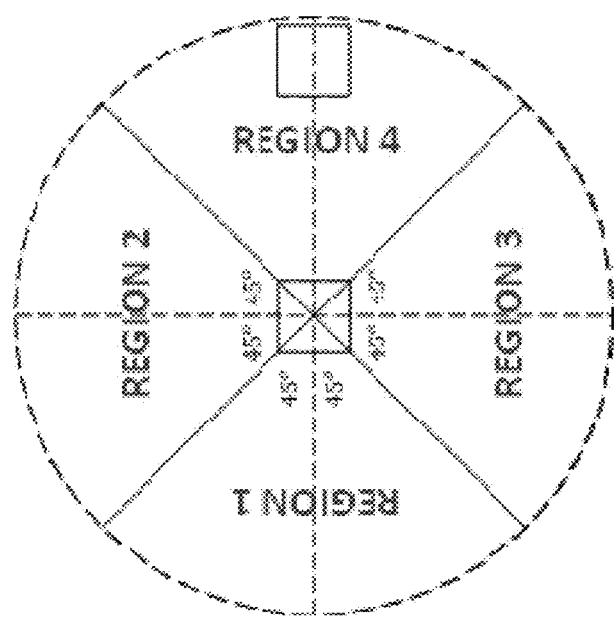
FIG. 8 illustrates an example of dividing an area surrounding a victim contact into four regions.
Figure 9:
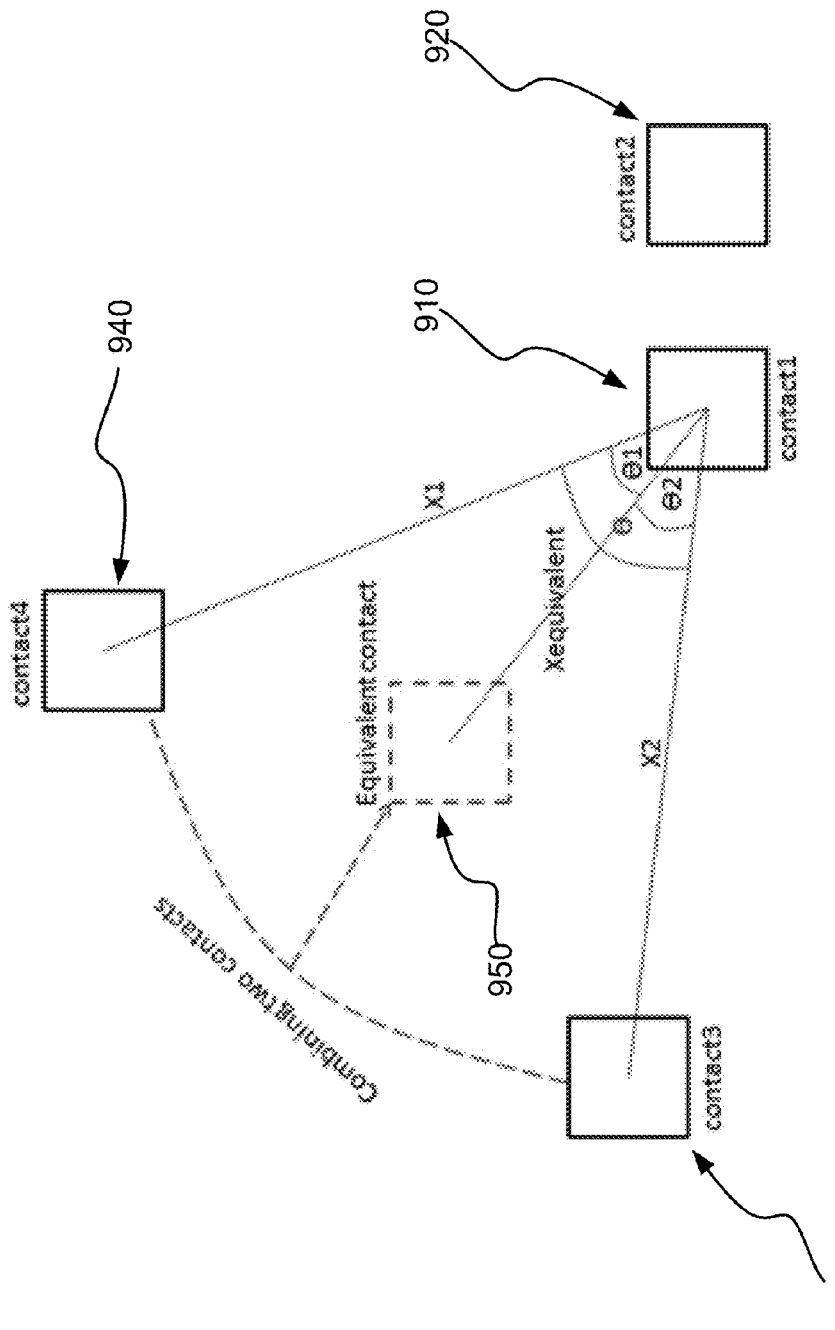
FIG. 9 illustrates an example of combining two contacts in a region surrounding a victim contact into one equivalent contact.

In some implementations, the clustering subunit 621 divides the area surrounding the victim contact into four regions as shown in FIG. 8. Contacts in each of the four regions are clustered separately into a single equivalent contact. FIG. 9 illustrates an example of contact clustering. In the figure, contact 910 is the victim, contact 920 is the aggressor, and contacts 930 and 940 are in the same region surrounding contact 910. Contacts 930 and 940 are separated from contact 910 by x2 and x1, respectively. The angle between the two contacts is θ.

The clustering subunit 621 may combine contacts 930 and 940 into an equivalent contact 950 using an empirical solution:

$$x_{equivalent} = \frac{x1 * x2}{x1 + x2} \quad (15)$$

$$\theta 1 = \frac{x_{equivalent}}{x2} * \theta \quad (16)$$

$$\theta 2 = \frac{x_{equivalent}}{x1} * \theta \quad (17)$$

As Eqs.(15)-(17) shown, the new radial position, $x_{equivalent}$, will always be less than the value of the smallest distance, $x_i$. If there more contacts in the region, they can be combined in turn to derive a final equivalent contact.

If the equivalent contact (e.g., contact 950 in FIG. 9) does not form either the horizontal configuration nor the L-shaped configuration with the victim and aggressor contacts, the projection subunit 623 will use either a horizontal impedance model or a L-shaped impedance model to represent the equivalent contact based on the region where it is located:

$$(y_{random\ shape})_{not\ isolated} = beta * [(y_{l-shape})_{not\ isolated}] \quad (18)$$

$$(y_{random\ shape})_{not\ isolated} = beta * [(y_{horizontal})_{not\ isolated}] \quad (19)$$

where $(y_{random\ shape})_{not\ isolated}$ represents the admittance after the operation performed by the clustering subunit 621, and $(y_{l-shape})_{not\ isolated}$ and $(y_{horizontal})_{not\ isolated}$ represent the admittance after the operation performed by the projection subunit 623. The parameter beta may be expressed as:

$$beta = k1 + k2 * \theta^{k3} \text{ or}$$

$$beta = k1 + k2 * \theta^{k3} + k4 * freq^{k5} \quad (20)$$

Combining Eqs. (18)/(19) and (12), the admittance for two contacts in the present of an arbitrarily arranged neighboring contacts can be represented by the admittance for two isolated contacts:

$$y_{total} = \text{alpha} * \text{beta} * y_{two\ contacts} \quad (21)$$

As also noted previously, the substrate parasitics modeling unit 620 may comprise the clustering subunit 621 and the projection subunit 623, configured in a way shown in FIG. 6C. In this configuration, the projection subunit 623 first derives horizontal/vertical impedance components by using the horizontal impedance model and/or the L-shape impedance model to represent the one or more other elements and the clustering subunit 621 then combines the derived horizontal/vertical impedance components.

Next, the simulation unit 640 performs circuit simulation on a circuit associated with the layout design. The circuit includes a parasitic element having the electrical impedance and may be represented by a netlist. The netlist may be extracted from the layout design.

Conclusion

Having illustrated and described the principles of the disclosed techniques, it will be apparent to those skilled in the art that the disclosed embodiments can be modified in arrangement and detail without departing from such principles. In view of the many possible embodiments to which the principles of the disclosed techniques can be applied, it should be recognized that the illustrated embodiments are only preferred examples of the techniques and should not be taken as limiting the scope of the disclosed techniques. Rather, the scope of the disclosed techniques is defined by the following claims and their equivalents. We therefore claim as our disclosed techniques all that comes within the scope and spirit of these claims.

What is claimed is:

1. A method, executed by at least one processor of a computer, comprising:
    clustering two or more neighboring substrate contacts;
    combining the two or more neighboring substrate contacts into one equivalent substrate contact by calculating a position for the equivalent substrate contact;
    modeling electrical impedance between a first substrate contact and a second substrate contact in the presence of the equivalent substrate contact based on one of a horizontal impedance model and an L-shaped impedance model, wherein the first substrate contact, the second substrate contact and the two or more neighboring substrate contacts are substrate contacts in a layout design and/or particular areas of the layout design, and
    wherein the horizontal impedance model models electrical impedance for the first substrate contact and the second substrate contact in the presence of the equivalent substrate contact positioned on a line that passes through the first substrate contact and the second substrate contact, and
    wherein the L-shaped impedance model models electrical impedance for the first substrate contact and the second substrate contact in the presence of the equivalent substrate contact positioned on a line that passes through one of the first substrate contact and the second substrate contact and is perpendicular to a line passing through the first substrate contact and the second substrate contact;
    performing circuit simulation on a circuit associated with the layout design, wherein the circuit includes a parasitic element having the electrical impedance; and
    fabricating an integrated circuit based upon the layout design.

2. The method recited in claim 1, wherein the two or more neighboring substrate contacts are located in a first quadrant, further comprising:
    identifying a second quadrant comprising two or more additional neighboring substrate contacts;
    combining the two or more additional neighboring substrate contacts into one additional equivalent substrate contact;
    wherein the additional equivalent substrate contact is included hen modeling the electrical impedance.

3. The method recited in claim 1, wherein the combining comprises:
    clustering the two or more neighboring substrate contacts based on four quadrants centered on the first substrate contact.

4. The method recited in claim 1, wherein the modeling comprises:
    combining substrate contacts aligned in a horizontal configuration into a first equivalent substrate contact and disposed in an L-shaped configuration into a second equivalent substrate contact.

5. The method recited in claim 1, wherein the circuit is represented by a netlist.

6. The method recited in claim 1, wherein the position of the equivalent substrate contact is calculated using the following equations:

$$x_{equivalent} = \frac{x1 * x2}{x1 + x2}$$

$$\theta 1 = \frac{x_{equivalent}}{x2} * \theta$$

$$\theta 2 = \frac{x_{equivalent}}{x1} * \theta.$$

7. A process for fabricating an integrated circuit comprising:
    preparing a non-transitory computer-readable medium storing processor-executable instructions for causing one or more processors to perform a method, the method comprising:
    clustering two or more neighboring substrate contacts;
    combining the two or more neighboring substrate contacts into one equivalent substrate contact by calculating a position for the equivalent substrate contact;
    modeling an electrical impedance between a first substrate contact and a second substrate contact in the presence of the equivalent substrate contact based on one of a horizontal impedance model and an L-shaped impedance model, wherein the first substrate contact, the second substrate contact and the two or more neighboring substrate contacts are substrate contacts in a layout design and/or particular areas of the layout design, and
    wherein the horizontal impedance model models electrical impedance for the first substrate contact and the second substrate contact in the presence of the equivalent substrate contact positioned on a line that passes through the first substrate contact and the second substrate contact, and the L-shaped impedance model models electrical impedance for the first substrate contact and the second substrate contact in the presence of the equivalent substrate contact positioned on a line that passes through one of the first substrate contact and the second substrate contact and is perpendicular to a line passing through the first substrate contact and the second substrate contact; and performing circuit simulation on a circuit associated with the layout design, wherein the circuit includes a parasitic element having the electrical impedance; and fabricating the integrated circuit according to the layout design.

8. The process recited in claim 7, wherein the two or mare neighboring substrate contacts are located in a first quadrant, wherein the modeling further comprises:

identifying a second quadrant comprising two or more additional neighboring substrate contacts;

combining the two or more additional neighboring substrate contacts into one additional equivalent substrate contact;

wherein the additional equivalent substrate contact is included when modeling the electrical impedance.

9. The process recited in claim 7, wherein the combining comprises:

clustering the two or more neighboring substrate contacts based on four quadrants centered on the first substrate contact.

10. The process recited in claim 7, wherein the modeling comprises:

combining substrate contacts aligned in a horizontal configuration into a single substrate contact and substrate contacts in the one or more substrate contacts that forms the L-shaped configuration into a single substrate contact.

11. The process recited in claim 7, wherein the circuit is represented by a netlist.

12. The process recited in claim 7, wherein the position of the equivalent substrate contact is calculated using the following equations:

$$x_{equivalent} = \frac{x1 * x2}{x1 + x2}$$

$$\theta 1 = \frac{x_{equivalent}}{x2} * \theta$$

$$\theta 2 = \frac{x_{equivalent}}{x1} * \theta.$$

13. A system, comprising:

a substrate parasitics modeling unit configured to model electrical impedance between a first substrate contact and a second substrate contact in the presence of one two or more other neighboring substrate contacts based on one of a horizontal impedance model and an L-shaped impedance model, wherein the first substrate contact, the second substrate contact and the two or more neighboring substrate contacts are substrate contacts in a layout design and/or particular areas of the layout design, the horizontal impedance model models electrical impedance for the first substrate contact and the second substrate contact in the presence of an equivalent substrate contact obtained by calculating a position for the equivalent substrate contact based upon positions of the two or more neighboring substrate contacts wherein the equivalent substrate contact is positioned on a line that passes through the two substrate contacts, and the L-shaped impedance model models electrical impedance for the first substrate contact and the second substrate contact in the presence of an equivalent substrate contact by calculating a position for the equivalent substrate contact based upon positions of two or more neighboring substrate contacts wherein the equivalent substrate contact is positioned on a line that passes through one of the first substrate contact and the second substrate contact and is perpendicular to a line passing through the first substrate contact and the second substrate contact; and a simulation unit configured to perform circuit simulation on a circuit associated with the layout design, wherein the circuit includes a parasitic element having the electrical impedance; and a fabrication facility configured for fabricating an integrated circuit according to the layout design.

14. The system recited in claim 13, wherein the two or more neighboring substrate contacts are located in a first quadrant and wherein the substrate parasitics modeling unit comprises:

identifying a second quadrant comprising two or more additional neighboring substrate contacts; and combining the two or more additional substrate contacts into one additional equivalent substrate contact.

15. The system recited in claim 13, wherein the circuit is represented by a netlist.

16. The system recited in claim 13, wherein the position of the equivalent substrate contact is calculated using the following equations:

$$x_{equivalent} = \frac{x1 * x2}{x1 + x2}$$

$$\theta 1 = \frac{x_{equivalent}}{x2} * \theta$$

$$\theta 2 = \frac{x_{equivalent}}{x1} * \theta.$$

* * * * *